(12) United States Patent
Luciano, Jr. et al.

(10) Patent No.: US 10,493,329 B1
(45) Date of Patent: Dec. 3, 2019

(54) GOLF BALL TRACKING SYSTEM AND METHOD

(71) Applicants: Robert A. Luciano, Jr., Reno, NV (US); William K. Bertram, Reno, NV (US); Warren R. White, Reno, NV (US)

(72) Inventors: Robert A. Luciano, Jr., Reno, NV (US); William K. Bertram, Reno, NV (US); Warren R. White, Reno, NV (US)

(73) Assignee: EDGE TECHNOLOGY, Reno, NV (US)

(*) Notice: Subject to any disclaimer, the term of this patent is extended or adjusted under 35 U.S.C. 154(b) by 0 days.

(21) Appl. No.: 15/696,166

(22) Filed: Sep. 5, 2017

(51) Int. Cl.
| | |
|---|---|
| A63B 71/06 | (2006.01) |
| A63B 43/00 | (2006.01) |
| H02J 7/02 | (2016.01) |
| A63B 67/02 | (2006.01) |
| A63B 37/00 | (2006.01) |
| A63B 24/00 | (2006.01) |
| A63B 63/00 | (2006.01) |

(52) U.S. Cl.
CPC ........ *A63B 43/004* (2013.01); *A63B 24/0021* (2013.01); *A63B 37/0003* (2013.01); *A63B 67/02* (2013.01); *H02J 7/025* (2013.01); *A63B 63/00* (2013.01); *A63B 2024/0034* (2013.01); *A63B 2220/40* (2013.01); *A63B 2225/54* (2013.01)

(58) Field of Classification Search
CPC ............ A63B 69/3658; A63B 37/0056; A63B 71/0622
USPC .................................................. 473/151–153
See application file for complete search history.

(56) References Cited

U.S. PATENT DOCUMENTS

2015/0105173 A1* 4/2015 Thurman ........... G09B 19/0038
473/199

* cited by examiner

*Primary Examiner* — Raeann Gorden
(74) *Attorney, Agent, or Firm* — Kerr IP Group, LLC

(57) ABSTRACT

A golf ball tracking system and method is described. The golf ball tracking system includes a golf ball and a stationary time of flight receiver. The golf ball includes a memory, a logic component, an antenna and a battery. The memory stores a unique identifier associated with the golf ball. The logic component is electrically coupled to the memory. The antenna is electrically coupled to the logic component. The battery is electrically coupled to the logic component, antenna and memory. The battery powers the transmission of the unique identifier using the antenna at one or more frequencies. The stationary time of flight (ToF) receiver configured to receive the unique identifier transmitted by the golf ball. The unique identifier communicated to the ToF receiver at a frequency that tracks the location of the golf ball along a ball path.

13 Claims, 10 Drawing Sheets

GOLF BALL TRACKING SYSTEM AND METHOD

FIELD

The present disclosure relates to a golf ball tracking system and method. More specifically, the disclosure relates to a golf ball that includes a battery that powers the transmission of a unique identifier from the battery assisted golf ball.

BACKGROUND

Traditionally, driving ranges were established to allow players to practice their golf game on an open field. During game play, a player strikes a golf ball at a flag placed some distance away and the player visually attempts to determine the landing position of the ball in relation to the flag. In view of the distance travelled by the golf ball, the relatively small size of the golf ball, weather and other such considerations, game play at a driving range has been limited to a singular and personal experience, in which the player could not compete with or play against other players in the driving range.

Driving ranges have increased in sophistication and include targets and score-keeping equipment, which reward the player when the target is hit or when the golf ball lands near the target.

One method for tracking golf balls includes embedding Radio Frequency Identification Devices (RFIDs) in golf balls used at the facility. These RFID golf balls have encoded values that can be detected by a generated radio frequency and antenna. The RFID in the ball is associated with a player or a particular hitting bay before it is hit by the player. When the player uses an RFID ball that is hit into a target area, that particular ball RFID is detected at a target equipped with RFID detection devices. This enables electronic scoring of hits on particular targets or target areas and the determination of which player hit which target area. This information can then be automatically detected by computer systems and used to score games that the player participates in.

Other technologies that may be used in combination with, or instead of, RFID identification have also been suggested. These include the use of Doppler radar, camera systems, lasers or positioning technologies, e.g. time-of-flight technologies.

Also, golf targets that may be used for gaming and/or gambling can be expected to require extremely high levels of accuracy to satisfy gaming regulators. Furthermore, golf targets may have to ensure that players are never "cheated" and that the game performs precisely as represented.

Thus, it would be beneficial to provide a golf ball tracking system and method tracks a plurality of balls with a high degree of integrity and redundancy from driving spaces or hitting bays to targets. Additionally, it would be beneficial to provide a golf ball target authentication system and method that authenticates the target is hit by the golf ball.

SUMMARY

A golf ball tracking system and method is described. The golf ball tracking system includes a golf ball and a stationary time of flight receiver. The golf ball includes a memory, a logic component, an antenna and a battery. The memory stores a unique identifier associated with the golf ball. The logic component is electrically coupled to the memory. The antenna is electrically coupled to the logic component. The battery is electrically coupled to the logic component, antenna and memory. The battery powers the transmission of the unique identifier using the antenna at one or more frequencies. The stationary time of flight (ToF) receiver configured to receive the unique identifier transmitted by the golf ball. The unique identifier communicated to the ToF receiver at a frequency that tracks the location of the golf ball along a ball path.

In one illustrative embodiment, the golf ball tracking system includes an RFID component that includes the memory.

In another illustrative embodiment, the golf ball tracking system includes an induction coil that is electrically coupled to the battery. The induction coil is configured to convert electromagnetic energy to electrical current that charges the battery. The golf ball tracking system having an induction coil includes a charging mode that charges the battery, when the unique identifier is not communicated by the golf ball.

In yet another embodiment, the golf ball tracking system includes an accelerometer sensor communicatively coupled to the logic component. The accelerometer determines when the golf ball is struck. In a further illustrative embodiment, the golf ball tracking system includes a low frequency reading mode that transmits the unique identifier at a low frequency before a change in acceleration detected by the accelerometer. In a still further illustrative embodiment, the golf ball tracking system includes a high frequency reading mode that transmits the unique identifier at a high frequency when a ball strike is detected based on the change in acceleration detected by the accelerometer.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

A golf ball target authentication system and method is described. The golf ball target authentication system authenticates a target is hit by the golf ball is described. The golf ball target authentication method includes initiating a game session. The authentication system and method associates a golf ball and player with a hitting location. A first tracking system disposed at the hitting location tracks the location of the golf ball along a ball path from the hitting location to the target. A second tracking system disposed at or proximate to the target location tracks the ball path from the hitting location to the target. A prize is awarded when the target is hit by the golf ball and the unique identifier is read by a target reader corresponding to the target. The game session ends when a target is hit by a golf ball.

Additionally, a golf ball tracking system that tracks a plurality of balls with a high degree of integrity and redundancy from driving spaces or hitting bays to targets is also described. The golf ball tracking system includes a golf ball and a stationary time of flight (ToF) receiver. The illustrative golf ball transmits a unique identifier associated with the golf ball. The stationary time of flight (ToF) receiver configured to receive the unique identifier transmitted by the golf ball. The unique identifier communicated to the ToF receiver at a frequency that tracks the location of the golf ball along a ball path.

Figure 1:
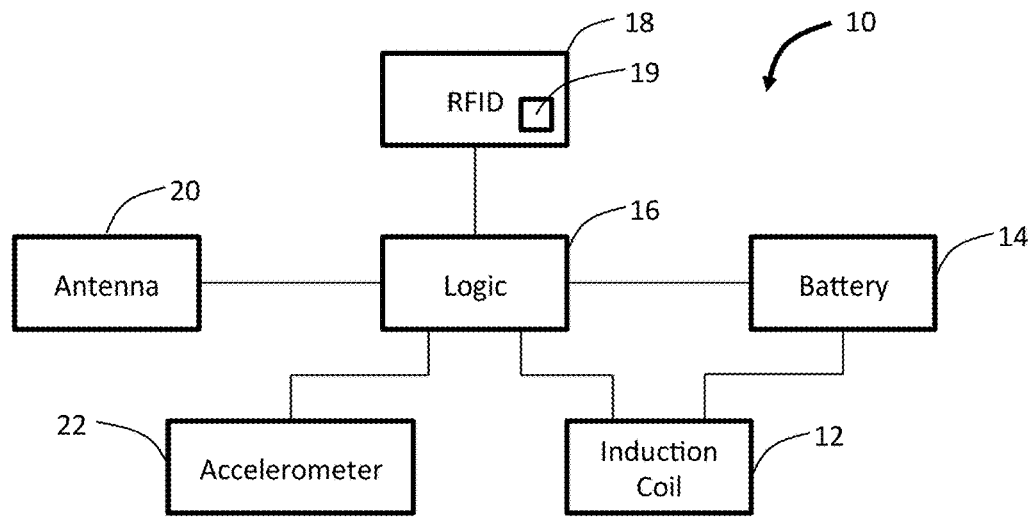
FIG. 1 shows a battery assisted RFID golf ball system.

Referring to FIG. 1 there is shown a battery assisted RFID system. The battery assisted RFID system presents a block diagram of an illustrative golf bass that can be used for golf ball tracking and for golf ball target authentication. The illustrative battery assisted RFID system 10 includes an induction coil 12, which is used to charge a battery 14. In the illustrative example, the induction coil 12 and battery 14 are electrically coupled to logic 16. By way of example the illustrative logic device 16 that includes a plurality of logic gates and may be embodied as a programmable logic device, programmable logic array, programmable array logic, field programmable gate array, other such logic devices and arrays that may be embodied in an integrated circuit (IC).

In the illustrative embodiment, the illustrative logic 16 is communicatively coupled to RFID component 18 and antenna 20. The RFID component includes a memory 19 that stores a unique identifier, which is transmitted with the antenna 20. Additionally, an illustrative accelerometer 22 is electrically coupled to logic 16.

Figure 5:
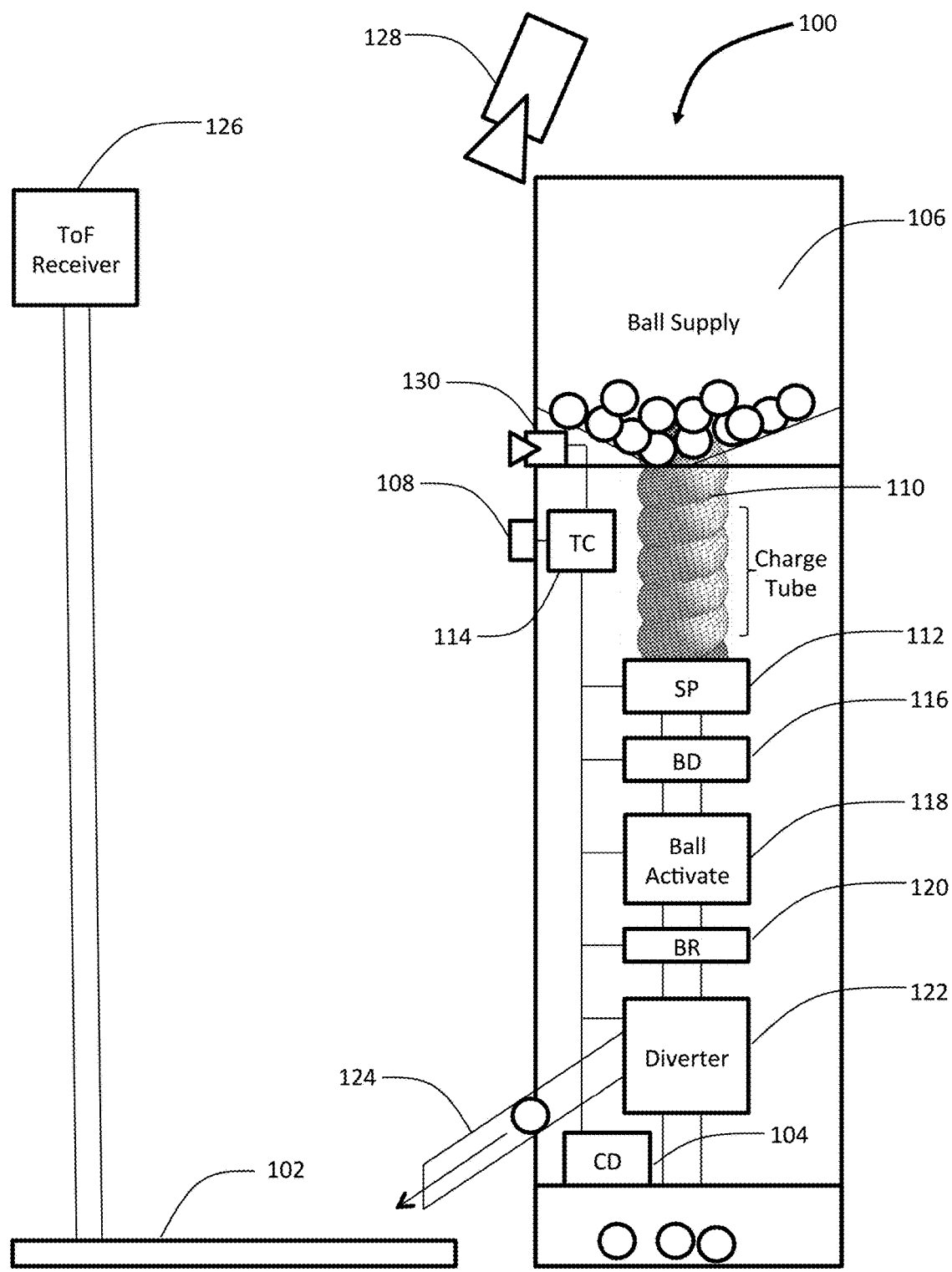
FIG. 5 shows an illustrative ball dispenser.

The battery assisted RFID system 10 transmits a signal to an illustrative Time of Flight (ToF) receiver as shown in FIG. 5 (see reference number 126). The battery assisted RFID system 10 transmits an RF signal to the ToF receiver 126. In operation, the internal battery 14 turns on and powers the RFID component 18 and logic 16, which generates a modulated signal with the tag's relevant information that is communicated via antenna 20. In one illustrative embodiment, the battery assisted RFID system 10 transmits an RF signal much farther than traditional passive RFID tags.

The illustrative accelerometer 22 is a sensor that is powered by battery 14. Other sensors may also be incorporated in the battery assisted RFID system 10. The accelerometer 22 is communicatively or electrically coupled to logic 16. In operation, the accelerometer 22 determines when the RFID golf ball has been struck and communicates the change in acceleration to logic 16.

To avoid replacing the battery, the RFID system 10 includes an induction coil 12, which enables inductive charging of the battery 14. In the illustrative embodiment, the RFID system induction coil 12 is a "receiver" coil that receives power from an electromagnetic field generated by a sender inductive coil (shown in FIG. 5 as reference number 110). The induction coil 12 converts the electromagnetic energy back into electric current, which is then used to charge the battery 14.

Figure 2A:
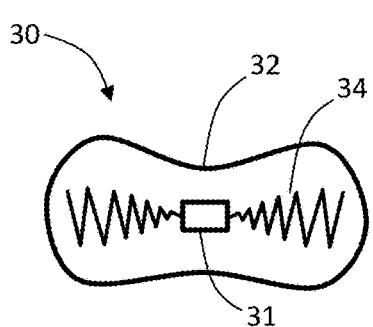
FIG. 2A shows an illustrative RFID tag.

Referring to FIG. 2A and FIG. 1 there is shown an illustrative RFID tag 30 that includes an RFID module 31. The RFID module 31 may include RFID component 18 that further includes a memory configured to store at least one unique identifier. A carrier material 32 receives the RFID module 31 and an RFID antenna 34 that extends from the RFID module 31. The RFID antenna 34 is electrically coupled to the RFID component 18. The RFID antenna 34 is disposed on the carrier material 32. The RFID module 31 may include an accelerometer 22. In a further illustrative embodiment, the RFID module 31 may include a battery 14. Thus, most of the elements of the battery assisted RFID system 10 may be included in the RFID module 31, with the exception of the induction coil 12.

Figure 2B:
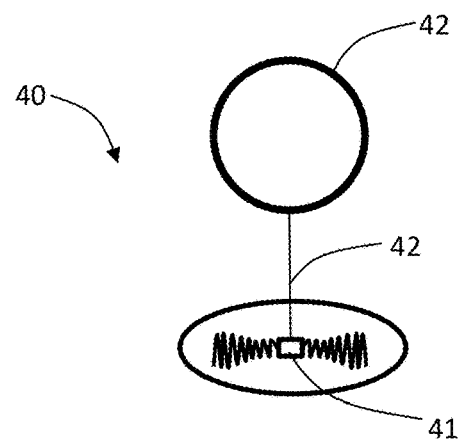
FIG. 2B shows another illustrative RFID tag that includes an RFID module that is electrically coupled to an induction coil.

Referring to FIG. 2B, there is shown another illustrative RFID tag 40 that includes an RFID module 41 that is electrically coupled via wire 42 to an induction coil 44. As stated above, the induction coil 42 enables the inductive charging a battery associated with the RFID module 41.

Figure 2C:
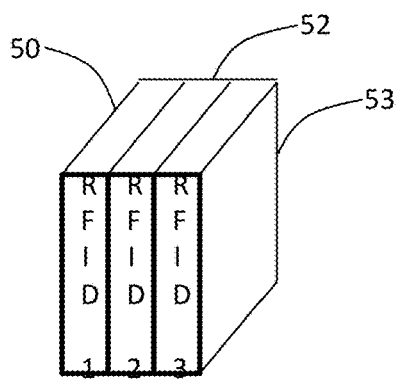
FIG. 2C shows a plurality of RFID modules coupled to one another.

Referring to FIG. 2C there is shown a plurality of RFID modules 50, 52 and 53 that are physically coupled to one another. The RFID modules 50, 52 and 53 are stacked next to one another so that failure of one the RFID modules does not prevent the remaining RFID modules from communicating one or more unique identifiers.

In one embodiment, at least one of the RFID modules 50, 52 and 53 includes an RFID integrated circuit. In another illustrative embodiment, at least one of the RFID modules 50, 52 and 53 includes an illustrative accelerometer 22 and logic 16.

The RFID modules 50, 52 and 53 may each be electrically coupled to a separate antenna. In another illustrative embodiment, a single antenna may be electrically coupled to each of the RFID modules.

Figure 2D:
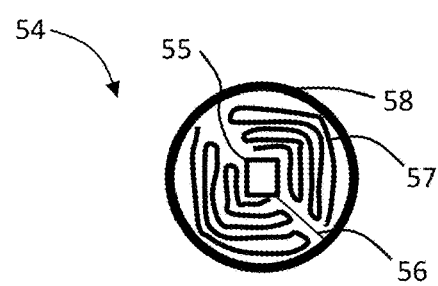
FIG. 2D shows a compact RFID tag.

Referring now to FIG. 2D, there is shown a compact RFID tag 54 that includes and RFID module 55, an RFID antenna 57 and an induction coil 58. Additionally, the RFID module 55 is electrically coupled to the RFID antenna 57.

The RFID module is also electrically coupled to induction coil 58 via conductive element 56.

Figure 3A:
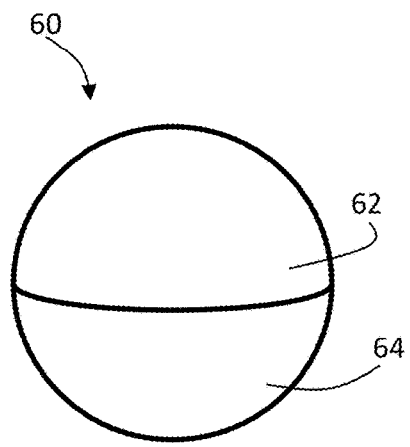
FIGS. 3A and 3B shows a compressible core encasing an illustrative battery assisted RFID golf ball.
Figure 3B:
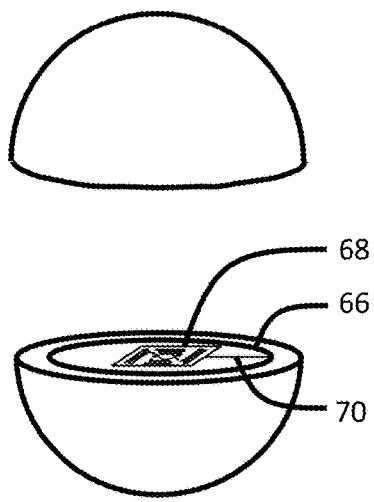

Referring to FIG. 3A and FIG. 3B there is shown a compressible core 60 encasing an illustrative battery assisted RFID golf ball 60 that his configured to receive an RFID module such as RFID module 31, 41, 50, 52, 53 and 55 described above in FIG. 2 and FIG. 1. The illustrative battery assisted RFID golf ball 60 includes a first hemisphere 62 and a second hemisphere 64 as shown in FIG. 3A. The RFID module may be coupled to a carrier material that includes an RFID antenna.

In the illustrative embodiment, the RFID system 10 is sandwiched between the top hemisphere 62 and the bottom hemisphere 64. The illustrative RFID system 10 includes an induction coil 66 that is electrically coupled to RFID module 68 via a conductive element 70. The RFID module 68 includes, by way of example and not limitation, a battery 14, logic 16, RFID component 18, antenna 20, an accelerometer 22 electrically coupled to logic 16. The RFID antenna 20 may also be disposed on the carrier material.

During manufacturing, the RFID system 10 is placed in a mold (not shown) that includes a lower tray (not shown) and upper tray (not shown). The mold is then heated and the top hemisphere 62 and bottom hemisphere 64 are melted so that the appropriate RFID system 10 is encased within a newly pressed spherical compressible core that is then encased or encapsulated by a dimpled molded covering or shell.

After the RFID chip has been sandwiched between hemispheres, the combination of half cores, RFID chip, and antenna are then placed in the appropriate mold and reheated. The reheat temperature is dependent on material properties of the core and the RFID system 10. For illustrative purposes, reheat is performed at 130° C.-204° C. and depends on the amount of applied pressure. In a narrower embodiment, the reheat temperature of 204° C. (400 F) is applied for 15-25 minutes.

Alternatively, a slug may be split into two sections and the RFID system 10 is disposed on the face of one of the slug sections, so that the RFID system 10 may be sandwiched between the two slug sections. The split slug with the sandwiched RFID system 10 may then be placed in a mold that is heated to form a compressible core with an embedded RFID tag.

Figure 4A:
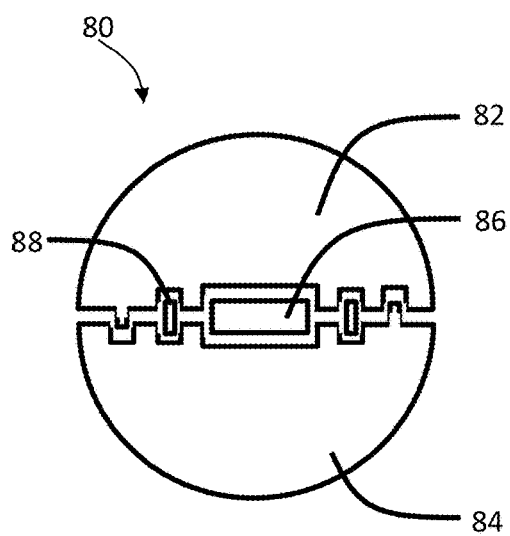
FIG. 4A shows a side view of the top hemisphere having a molded impression and a bottom hemisphere having a molded impression that receives an encapsulated RFID module and induction coil.

Referring to FIG. 4A there is shown a side view of a top hemisphere with a molded impression 82 and a bottom hemisphere having a molded impression 84 that receives an encapsulated RFID module 86 and an induction coil 80. The illustrative RFID system 10 includes an induction coil 88 that is electrically coupled to RFID module 86 via a conductive element 89. The illustrative RFID module 86 includes a battery 14, logic 16, RFID component 18, antenna 20 and an accelerometer 22 electrically coupled to logic 16 as described above.

Figure 4B:
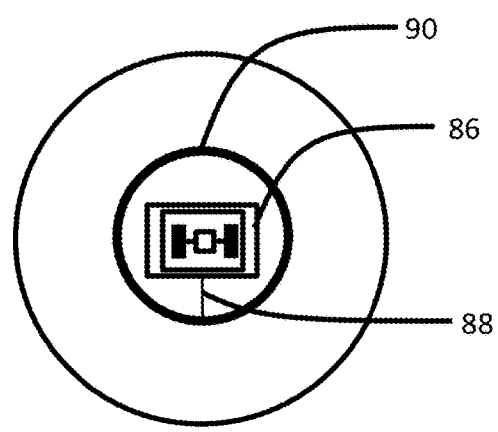
FIG. 4B shows a top view of the bottom hemisphere having a molded impression.

Referring to FIG. 4B there is shown top view of the bottom hemisphere with a molded impression 84. The compressible core includes the encapsulated RFID module 86 having a memory configured to store at least one unique identifier. By way of example and not of limitation, the RFID module 86 may be encapsulated by an epoxy resin or other such compound.

The illustrative battery assisted RFID golf balls may be manufactured using a mold that generates a half sphere. The illustrative half sphere mold may be composed of a metal alloy. The two half spheres may then be joined together to form a rubber golf ball that is then encased with a casing.

In operation, the battery assisted RFID golf balls include a "charging mode" that charges the battery using the induction coil. Alternatively, a battery having a sufficiently long battery life may be used without an induction coil—so that there is no need for a charging mode when there is no induction coil.

Operatively, the battery assisted RFID golf ball is read by a ball reader (as described in further detail below). The battery assisted RFID golf ball includes a "reading mode," in which the battery assisted RFID golf ball transmits the unique identifier associated with the RFID golf ball to an illustrative ToF receiver. In the illustrative embodiment, there are three different reading modes that include a low frequency reading mode, a high frequency reading mode and a shut-off read mode.

The low frequency reading mode may be triggered after the charging mode. During the low frequency reading mode, the battery assisted RFID golf ball transmits the associated unique identifier to the illustrative ToF receiver at a relatively low frequency to preserve the battery power in the batter assisted RFID golf ball. Additionally, the low frequency reading mode transmits the unique identifier at a low frequency before a significant change in acceleration is detected by the accelerometer. By way of example and not of limitation, the low frequency reading mode may transmit a unique identifier every one (1) second, e.g. 0.001 kHz.

The high frequency reading mode may be triggered by striking the RFID golf ball. A determination that the RFID golf ball has been hit may be determined by a sharp change in acceleration by the accelerometer 22 that is detected by the battery assisted RFID golf ball. More specifically, the high frequency reading mode transmits the unique identifier at a high frequency when a ball strike is detected based on the change in acceleration detected by the accelerometer. By way of example and not of limitation, the high frequency reading mode may transmit a unique identifier at a rate of 1 kHz.

The shut-off read mode is used to conserve power resources. The shut-off read mode turns off the high frequency reading mode. The high frequency mode reading mode is terminated after sufficient time has passed for the RFID golf ball to travel to the target and for the RFID golf ball to be read by the target. For example, after approximately 30 seconds the shut-off read mode is initiated and the high frequency reading mode is terminated. The shut-off read mode may completely turn off the read mode. Alternatively, the shut-off read mode may transition from the high frequency reading mode to the low frequency reading mode.

Referring now to FIG. 5, there is shown an illustrative ball dispenser 100 having a ToF receiver 126 that dispenses golf balls to the mat 102. For purposes of the illustrative embodiment, a "game session" may be initiated when the ball dispenser 100 dispenses a golf ball to the mat 102. Alternatively, a game session may begin when illustrative button 108 is engaged as described below. In a still further embodiment, the game session may be initiated when the battery assisted RFID golf ball is struck by a club and the club strike is detected by one or more sensors, e.g. a camera, accelerometer 22, or other such sensor.

In operation, the illustrative ball dispenser 100 verifies the unique identifier for each battery assisted RFID golf ball. Also, the ball dispenser 100 confirms that the dispensed golf balls have a readable RFID and communicate the unique identifier to an illustrative bay computing device 104. The bay computing device 104 may be embodied as a server, a virtual server, a client, a peer computing device, a controller, a control system, a field programmable gate array, and other such computing devices.

In the illustrative embodiment, the ball dispenser 100 receives golf balls from a ball supply 106. The golf balls may be either hand-loaded, loaded through a conveyor, loaded with a vacuum system or other such loading system. The ball dispenser 100 is activated by a player initiating a game session by interacting with the illustrative button 108. In one embodiment, the dispensing of the ball may be authorized when the player identification and sufficient player funds for game play are verified.

The illustrative battery assisted RFID golf ball is received by charging tube 110. The charging tube 110 operates using the "charging mode", which is initiated when the battery assisted RFID golf ball enters the charging tube. By way of example and not of limitation, the charging tube 110 includes an inductive charger having one or more induction coils that generates a "power" electromagnetic field. Each battery assisted RFID golf ball includes an illustrative induction coil 12 (as described in FIG. 1) that receives the powered alternating electromagnetic field generated by the charging tube 110. The alternating electromagnetic field captured by the illustrative RFID golf ball induction coil 12 is converted to electric current that, subsequently, charges the RFID golf ball battery 14.

In the illustrative embodiment, a ball activation module 112 changes the state of the battery assisted RFID golf ball from charging mode to "reading" mode. In reading mode, the battery assisted RFID golf ball transmits a unique identifier. As described above, the illustrative reading mode may include three different reading modes such as low frequency reading mode, high frequency reading mode and shut-off read mode. The low frequency reading mode may be triggered after the charging mode. During the low frequency reading mode, the battery assisted RFID golf ball transmits the associated unique identifier to an illustrative ToF receiver 126

The ball activation module 112 may be communicatively coupled to a tee controller 114, e.g. microprocessor, that activates a single-pass device 116 that allows a single ball to leave the bally supply 106 and pass a ball detector 118. The illustrative ball detector 118 includes an optical sensor that confirms to the tee controller 114 that a ball has been dispensed by the single-pass device 116. In various embodiments, other sensors capable of confirming the presence of a golf ball may be employed.

A ball reader 120 reads the battery assisted RFID golf ball that has passed the ball detector 118. The illustrative battery assisted RFID golf ball may operate in a low frequency reading mode that transmits a unique identifier every one (1) second, e.g. 0.001 kHz. The ball reader 120 communicates the unique identifier read from the ball to the tee controller 114, and thereby to computing device 104 that is communicatively coupled to an illustrative server having a database.

After the tee controller 114 receives the ball identifier from the ball reader 120, the tee controller 114 activates a diverter 122. The diverter 122 transfers the golf ball down a dispensing chute 124 onto the mat 102, where the ball can be hit by a player. As described above, the high frequency reading mode may be triggered by a player striking the battery assisted RFID golf ball. The detection of the player striking the golf ball is determined by a sharp change in acceleration that is detected by the accelerometer 22. By way of example and not of limitation, the high frequency reading mode may transmit a unique identifier at a rate of 1 kHz. The high frequency mode reading mode is terminated after sufficient time by a shut-off read mode that may completely turn off the read mode. The shut-off read mode may also transition from the high frequency reading mode to the low frequency reading mode.

The illustrative overhead camera 128 is angled above the player in the hitting bay. The overhead camera 128 is configured to follow the players swing and determine the direction that the ball is travelling. Additionally, a player facing camera 130 is disposed to capture an image of the player's face for biometric matching.

Figure 6:
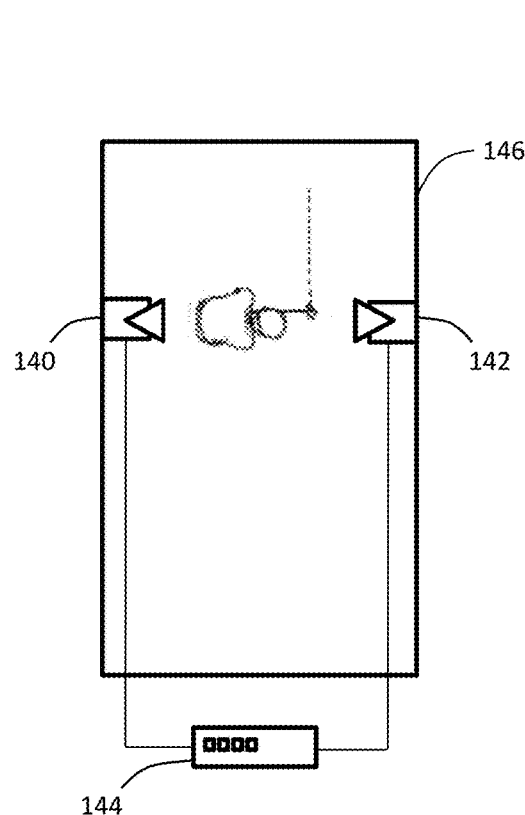
FIG. 6 shows two illustrative cameras that provide opposing views of the player in a hitting bay.

Referring to FIG. 6 there is shown two illustrative cameras 140 and 142 that provide opposing views of the player. In the illustrative embodiment, camera 142 provides a viewing angle that faces the right-handed golfer. Illustrative camera 140 provides a viewing angle that faces a left-handed golfer. An illustrative server (not shown) or the bay control unit 144 analyzes the various camera images, and records, minimally, the time that the illustrative RFID golf ball 145 is struck, the speed of the ball leaving a hitting bay 146, and the angle of horizontal inclination.

Figure 7:
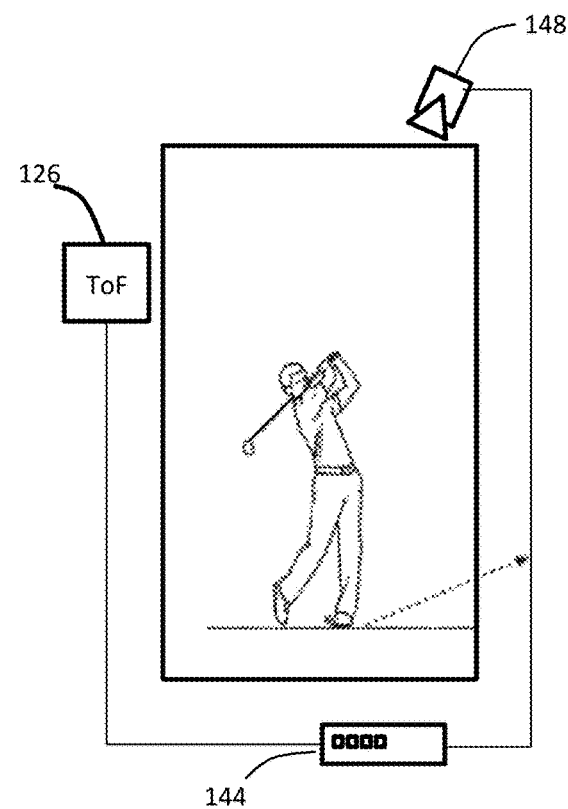
FIG. 7 shows an overhead camera placed at an angle that is above the player.

Referring now to FIG. 7, there is shown a further illustrative embodiment having another camera 148 that is placed at an angle overhead or above the golfer. Such an overhead camera 148 is capable of recording the left-to-right angle of a hit that may enable the server or illustrative bay control unit 144 to make a determination of any left or right turning of the trajectory, i.e., "hook" or "slice," that results from ball spin.

A Time of Flight (TOF) receiver 126 provides a line of sight for tracking the illustrative battery assisted RFID golf ball 145. The ToF receiver 126 is mounted behind the hitting bay. The illustrative ToF receiver 126 includes a RFID receiving antenna that is disposed at a height ranging from six (6) to eight (8) feet, which provides a better line of sight for targets at a lower elevation and above and to the left or right of any location from which a ball is expected to be hit.

The illustrative Time of Flight (ToF) receiver includes a ToF subsystem using light waves, ultrasound, radar and ultrawide band technologies. By way of example and not of limitation, the ToF receiver may use devices such as the Texas Instruments TDC 7201 time-to-digital converter and the Intersil ISL29501 ToF signal processing integrated circuit. The ToF receiver may also utilize a decaWave DW1000 ScenSor, which is a single chip wireless transceiver based on ultra-wide techniques that are compliant with IEEE802.15.4-2011 standard.

In one embodiment, the ToF receiver may operate by using only a receiver sub-component. In another embodiment, the ToF receiver may operate a receiver sub-component and a transmitter sub-component. The ToF receiver operates by scanning the ball flight path and measures the distance of the golf ball and the unique identifier associated with the illustrative golf ball.

Figure 8:
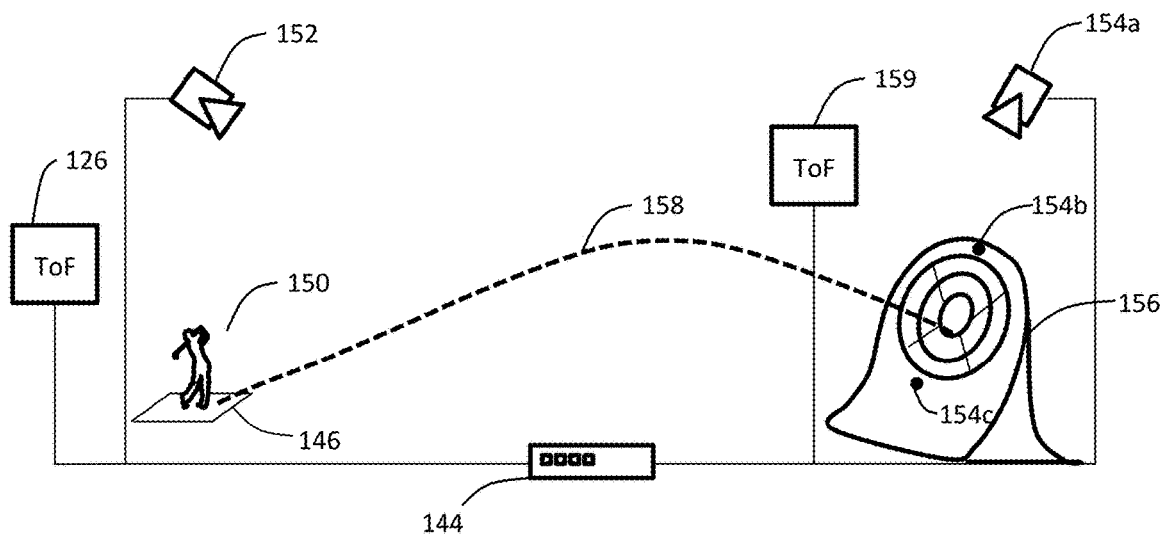
FIG. 8 shows an illustrative ball path after striking the ball from a hitting location such as a hitting bay.

Referring now to FIG. 8, there is shown a ball path 158 after the illustrative golf ball 145 has been struck from location 146, which may be a hitting bay or a hitting area on a driving range. Note, a hitting bay has a floor, walls and a ceiling, whereas a hitting area does not have a ceiling. After striking the illustrative battery assisted RFID golf ball 145, the ball 145 travels along ball path 158 toward target 156. The illustrative ToF receiver 126 is mounted behind the hitting bay 150 at a height ranging from six (6) to eight (8) feet, which provides a better line of sight to track ball path from location 146. Additionally, another illustrative ToF receiver 159 is shown that is adjacent to the target 156 also provides a line of sight for the ball path 158. That unit is also located above or below the target face and to the left or right of the target face. Both the TOF receivers 126 and 159 may be communicatively coupled to the bay control unit 144, which may determine the ball path 158.

Additionally, the ball path 158 may be tracked by camera 152, camera 154a, camera 154b and camera 154c. The cameras 154b and 154c may be disposed or integrated with target 156. By way of example and not of limitation, the cameras 152, 154a, 154b and 154c may be communicatively coupled to the bay control unit 144. The exterior overhead cameras 152 positioned above the illustrative hitting bay in location 146 may have a separate and distinct opportunity to capture the path of the ball. The server or bay control unit 144 is capable of recording the time of the ball leaving the hitting bay 146, the speed of the ball and the ball trajectory.

In one embodiment, the camera 152 follows the flight path 158 and camera 152 data may be used to determine a likely destination target 156. Additionally, using time and angle measurements from all cameras 152, 154a, 154b and 154c may be employed so that the server or bay control unit 144 may integrate the data and produce an accurate record of each ball hit, which includes the ball trajectory 158 and the target 156 hit, or whether any other target strike.

The ToF receivers 126 and 159 provide a redundant ball tracking system for the camera based tracking system. Additionally, the ToF receiver 126 and 159 may provide the ability to increase the number of images captured by the cameras 154b and 154c. The ToF receivers 126 and 159 generate data output that, for illustrative purposes, may be processed by bay control unit 144. By way of example and not of limitation, the bay control unit 144 determines that the illustrative battery assisted RFID golf ball is 10 meters from the target 156, which triggers the cameras 154a, 154b and 154c to increase the number of images captured by the camera 154a, 154b and 154c so that the precise target struck by the RFID golf ball may be determined.

The ToF receivers 126 and 159 receive RF signals from the battery assisted RFID golf ball 145. By way of example and not of limitation, the battery assisted RFID golf ball 145 transmits RF signals at an illustrative oscillator mode of 1 kHz. Therefore, an illustrative golf ball travelling at 200 ft/s (136 mph) will travel 2 inches for each time of flight (ToF) cycle. In operation, the time of flight data gives the location of the ball on a parabolic trajectory proximate to the ToF receiver 126. In the illustrative embodiment, the first 4 or 5 measurements may be on a straight line with the tee location included.

In the illustrative embodiment, the first few data point may be used to establish the horizontal velocity component and vertical velocity component, which provides the velocity vector. The launch angle may then be determined by using a best fit algorithm that finds the angle that minimizes the variation in the horizontal velocity components and similarly for the vertical components of velocity. The magnitude of the velocity vector can be found by averaging the distance travelled between ToF data points.

As the ToF receivers 126 and 159 receives more data, the illustrative ToF receivers 126 and 159 and the bay control unit 144 is configured to monitor changes in flight. The vertical component of velocity slowly decrease because of gravity and this change amounts to about −1 cm/sec, independent of the initial value. The illustrative combination of the ToF receivers 126, 159 and bay control unit 144 are configured to monitor changes due to spin or wind or snow and correct accordingly. Furthermore, if there are any sudden changes to the ball flight, then the ToF receiver 126 and 159 may continue to track the illustrative battery assisted golf ball 145 along ball path 158.

The server or bay control unit 144 analyzes the location of balls on an illustrative tee before the ball is hit, and tracks a multiplicity of balls, each potentially with a known RFID value. In so doing, the server or bay control unit 144 provides positive confirmation of which ball was from the illustrative tee at the time the ball was struck.

Figure 9:
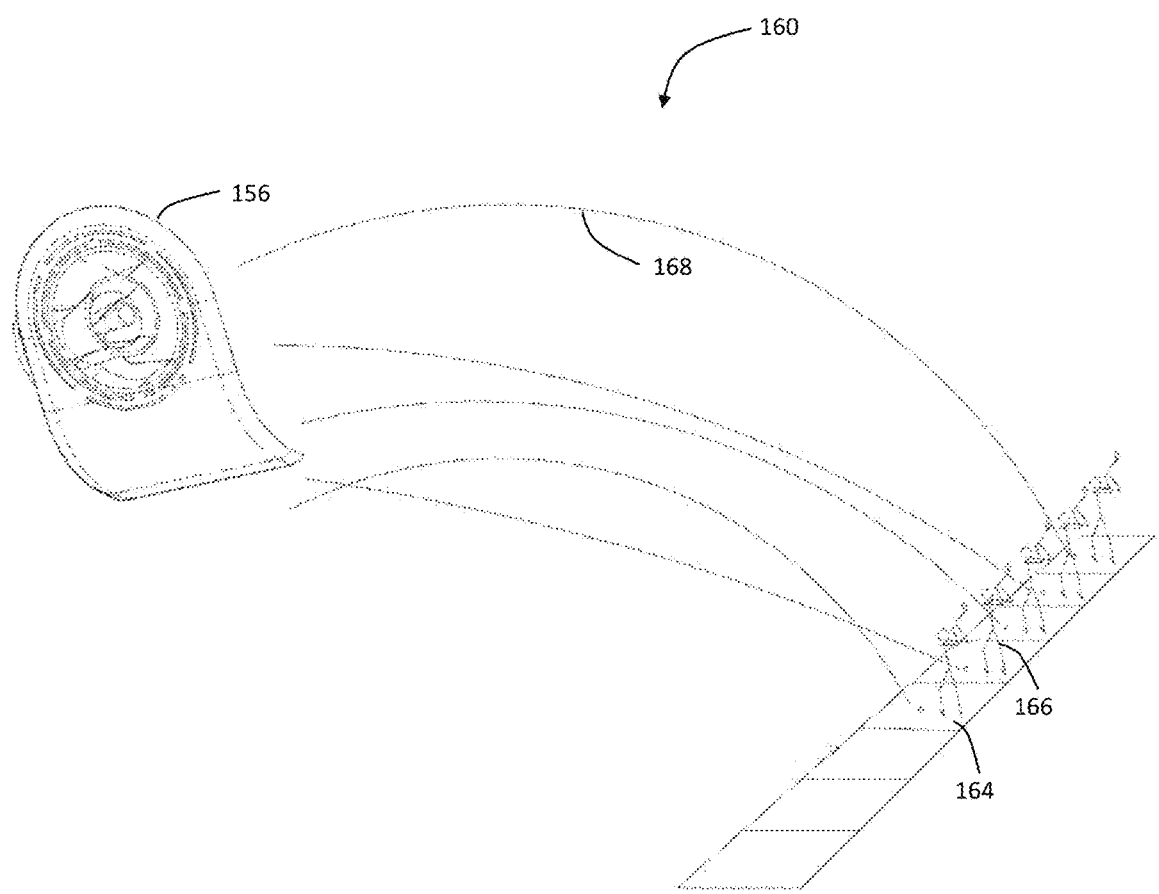
FIG. 9 shows an illustrative embodiment of a movable golf target system.

Referring to FIG. 9, there is shown an illustrative embodiment of a movable golf target system 160. The movable golf target system 160 includes at least one movable target 156, an exemplary driving space 164 and an exemplary player 166. The movable target remains in a fixed location during game play, however, the movable target 156 may be moved to another location before initiating a new game session. The game session may be a game of skill, a game of chance or any combination thereof.

By way of example and not of limitation, the player 166 hits a ball along a flight path 168 towards the movable target 156. Upon striking the target 156, the player 166 may be credited a value or a prize for the target strike. The target 156 may then be moved to a second location where the player 166 may again hit a ball towards the target 156 and earn a prize or a target value for the strike. The locations of each target may be determined using a GPS device as described in further detail below.

Figure 10:
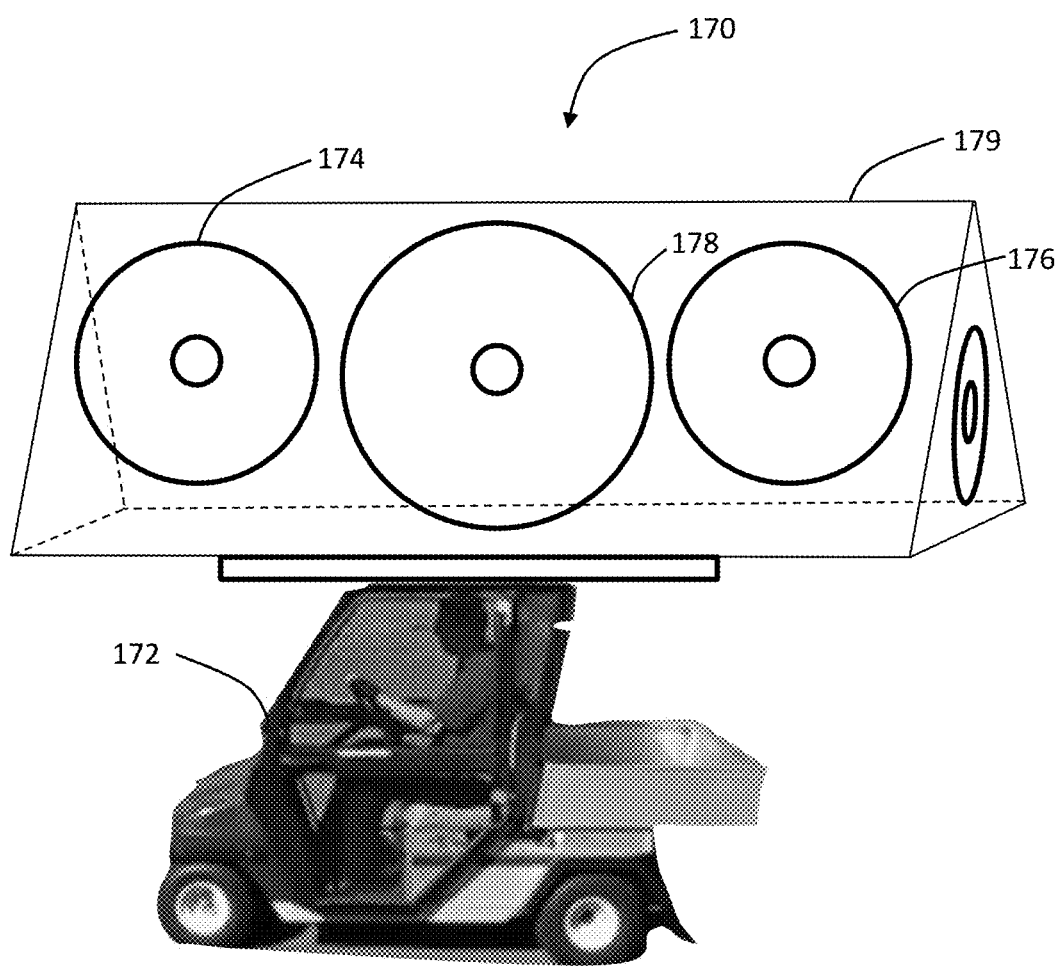
FIG. 10 shows an illustrative moving target system.

Referring to FIG. 10, there is shown an illustrative moving target system. The illustrative moving target system 170 is disposed on an illustrative golf ball picker vehicle 172. The golf ball picker vehicle 172 is a vehicle that picks up golf balls with the assistance of a golf ball picker attachment (not shown). Commonly, players on the driving range attempt to hit the moving golf ball picker vehicle 172. In the illustrative embodiment, a variety of different targets 174, 176, 178 and 180 are attached to the moving vehicle 172. By way of example and not of limitation, the smaller vertical targets 174 and 176 are adjacent to a larger central vertical target 178. An illustrative horizontal target 179 is orthogonal to the vertical targets 174, 176 and 178. Each of these targets may be conical or have a "funnel" shape.

The illustrative movable golf target system 160 and moving golf target system 170 may be located at a driving range where multiple players 166 may shoot golf balls at the same illustrative movable golf target 156 and/or the moving target system 170. By way of example and not of limitation, one or more of the moving targets 174, 176, 178 and 179 may include a GPS module that can be used to determine the location for each moving target, which may then be used for a game of skill, game of chance or any combination thereof.

Figure 11:
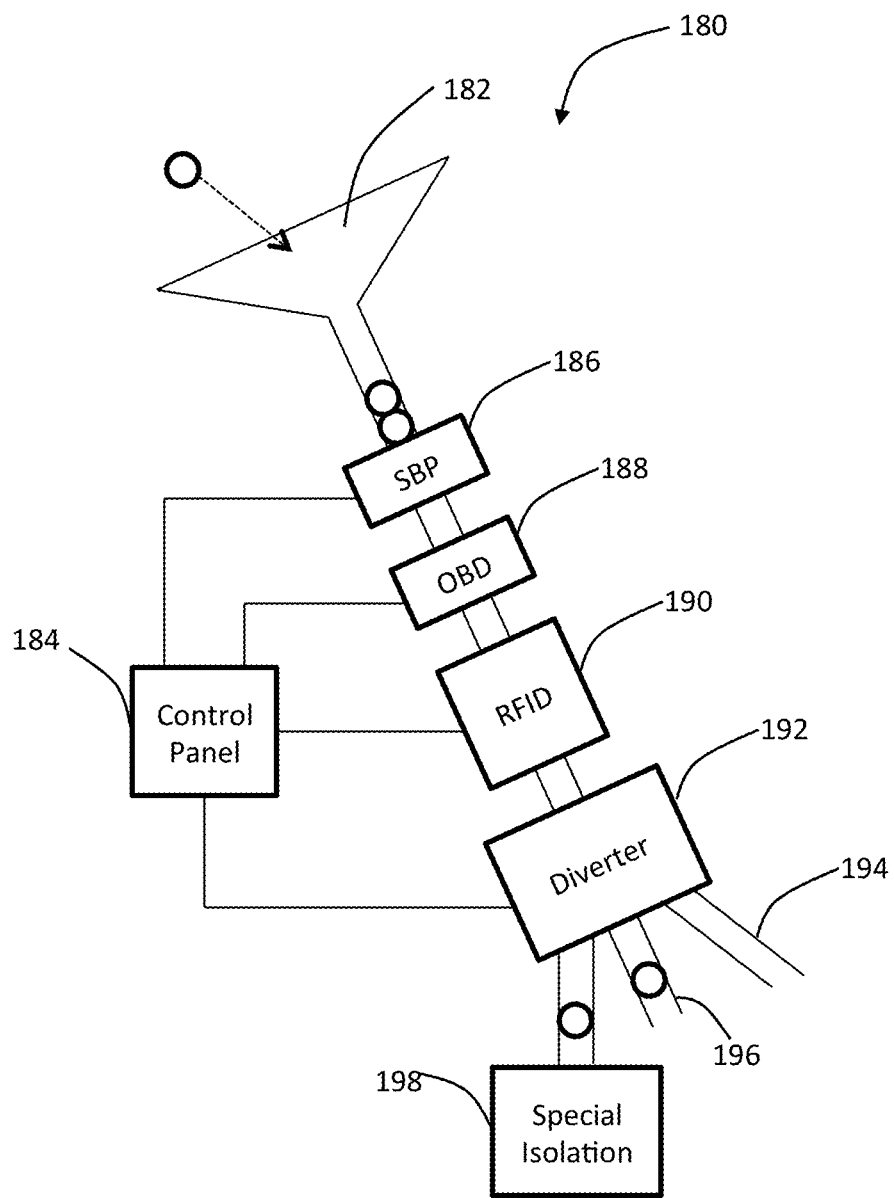
FIG. 11 shows an illustrative target system configured to read an RFID golf ball.

Referring to FIG. 11, there is shown an illustrative target system 180 configured to read an RFID golf ball. The illustrative target system 180 may be disposed within target 156 or target 170. The target system 180 includes at least one opening into which an illustrative battery assisted RFID golf ball can enter and then travel through an entry area 182 into a single ball pass unit 186.

Balls enter through the entry area 182 and, under the control of a target control unit 184. The illustrative battery assisted RFID golf ball passes through a single-ball-pass unit 186, which will allow only one ball at a time to be processed. A ball detector 188 confirms to the control unit 184 that a ball has passed. The ball detector 188 may be an optical ball detector (OBD). An RFID reader 190 will report the RFID or other unique identifier of the ball to the control unit 184 and via the network (not shown) to the server (not shown). If there is no RFID read or other unique identifier from the RFID reader 190, then the control computer 184 will send a message to a diverter 192 to send the unidentifiable ball to a rejected ball chute 194, which will cause balls without readable RFID signals or other unique identification indicator to be collected and disposed. The unidentifiable ball hit is also reported to the control unit 184 and thereby the server for further analysis. Balls with readable signals will be reported to the server and the ball will be routed down a normal return chute 196 where they will be available for collection and return to normal play.

In the event that a ball is of sufficient interest, as it would be if there was a high-value prize associated with the target 156 or target area 170, then the target control unit 184 could be preconfigured to route certain balls to a special isolation area 198. This could be a locked container where balls that are associated with high-value prize hits are retained for security validation purposes. This would be done by direction from the server to the target control unit 184.

Figure 12:
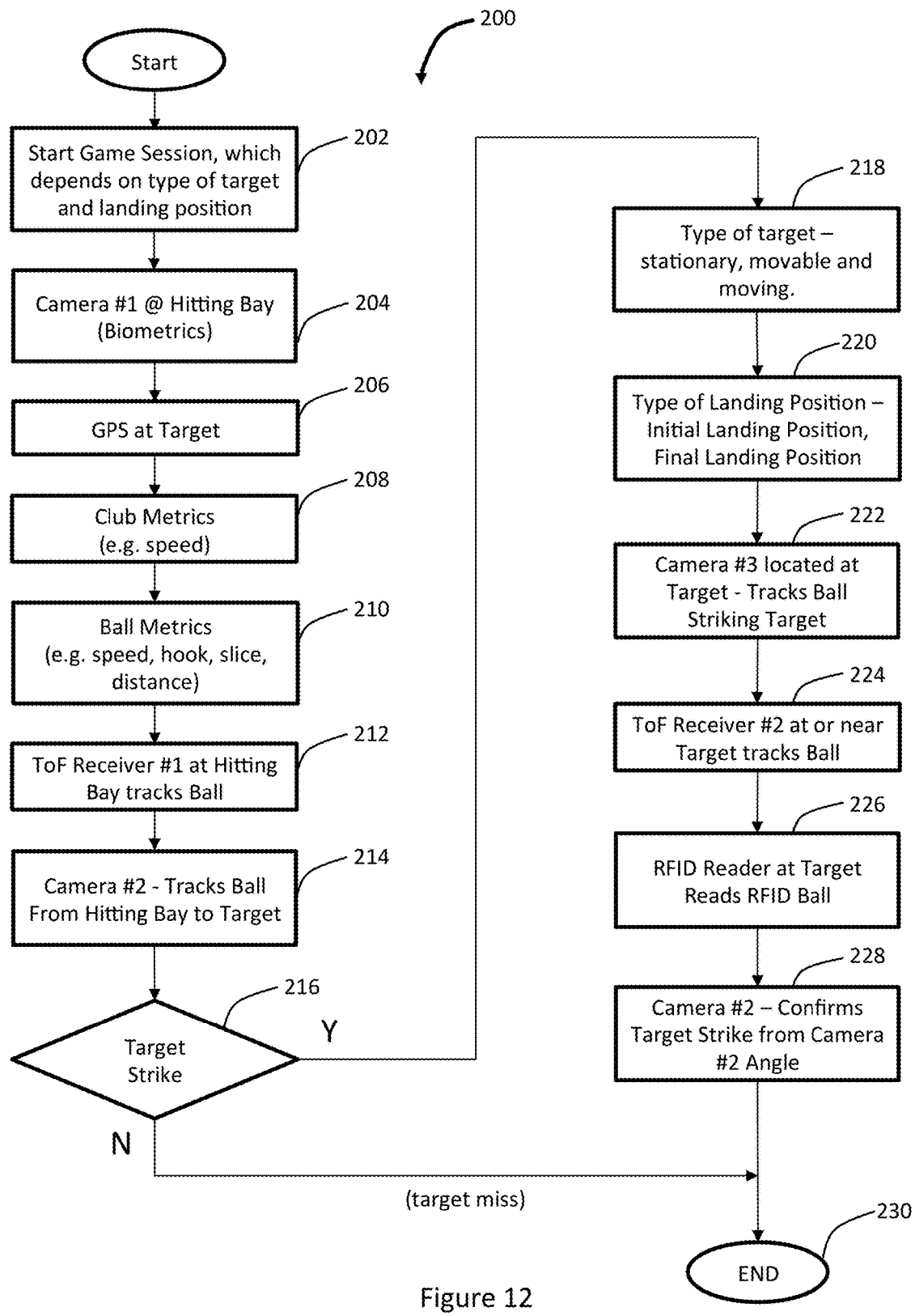
FIG. 12 shows an illustrative flowchart for an illustrative game session that is monitored by a camera and a time of flight (ToF) receiver.

Referring to FIG. 12 there is shown a flowchart for an illustrative game session that is monitored by the cameras and ToF receivers described above. The illustrative flowchart 200 begins at block 202, when a game session is initiated. The game session may depend on the type of target and the landing position. The target may be a static target, a movable target or a moving target. The landing position is determined after the ball hits the ground and stops.

At block 204, an illustrative first camera disposed in the hitting bay determines that a player is in the hitting bay. The illustrative camera may be an overhead camera 128 or 148, a player facing camera 130. The illustrative camera may act a sensor that captures a player biometric, e.g. a face, and communicates the captured biometric to a database for matching the biometric.

At block 206, a GPS reading for a particular target is determined. The GPS target reading remains static for a static target, however, the GPS target reading will change for a moving target or a movable target. Another GPS sensor may be located at a particular hitting bay so that the precise distance between the moving and/or movable target may be accurately determined. Distance accuracy may be an essential game element for a particular game, e.g. a paytable may vary or change depending on the precise distance between the hitting bay and the target. By way of example, a first paytable may be applicable for a target at a distance for 100-110 yards and a different paytable may be application for a target at a distance of 110-120 yards.

At illustrative block 208, the club metrics are monitored or determined by the illustrative hitting booth cameras described above. For example, camera 148 (described in FIG. 7) may be disposed at an angle overhead or above the golfer so the camera 148 can determine the club speed.

The method may then proceed to block 210 where ball metrics may be calculated and/or recorded. For example, camera 148 may be configured to record the left-to-right angle of a hit that may enable the server or illustrative bay control unit to make a determination of any left or right turning of the trajectory, i.e., "hook" or "slice," that results from ball spin. Additionally, the ball speed may also be determined using the camera sensor input, which may further be used to extrapolate the ball path and distance travelled.

At block 212, an illustrative first Time of Flight (ToF) receiver tracks the battery assisted RFID golf ball. By way of example and not of limitation, illustrative ToF receiver 126 is mounted behind the hitting bay at a height ranging from six (6) to eight (8) feet, which provides a better line of sight to track ball path from location 146. After the illustrative golf ball 145 has been struck from location 146, the illustrative battery assisted RFID golf ball 145 travels along ball path 158 toward target 156 (see FIG. 8).

At block 214, another illustrative camera tracks the illustrative battery assisted RFID golf ball. By way of example and not of limitation, the camera 152 (shown in FIG. 8) is positioned above the illustrative hitting bay and may have a separate and distinct opportunity to capture the path of the ball. The server or bay control unit 144 is capable of recording the time of the ball leaving the hitting bay, the speed of the ball and the ball trajectory. In one embodiment, the camera 152 follows the flight path 158 and camera 152 data may be used to determine a likely destination target 156.

At block 216, a determination is made that the illustrative target has been struck. If the target is missed, then the game session has been terminated and the game session ends 230. However, if the illustrative target 156 (see FIG. 8) has been hit, then the method proceeds to block 218.

As stated above, the game session depends on the type of target, as represented by block 218, and type of landing position, as represented by block 220. A stationary target remains stationary and not capable of being moved, e.g. an in-ground target. A movable target remains stationary during a game session, however, after the completion of the game session the movable target may be moved and the target moves from a first position to a second position. The moving target moves during the game session and may be managed or controlled by a human being or autonomously by artificial intelligence. The moving target may move in a random walk type scenario. Alternatively, the moving target may follow a pre-determined pattern of movement and repeat the pattern of movement over a period of time. The moving target may also combine a random walk with pre-determined pattern of movement.

The game session may also be dependent on the landing position of battery assisted RFID golf ball as described in block 220. The landing position for the targets described as moving and movable targets, generally, rely on an "initial" landing position. The initial landing position assumes that golf ball travels along a parabolic golf ball path and represents that first location that the ball lands. Note, certain movable or moving targets may accommodate golf ball bouncing before striking the moving and movable targets.

The final landing position is a location where the golf ball stops moving. For example, a typical golf game uses the final landing position as the basis for initiating the next skill based game event of hitting the golf ball closer to the hole in the green.

At block 222, a third camera located at or near the target tracks the illustrative golf ball as the illustrative RFID golf ball strikes the target. For example, when the illustrative battery assisted RFID golf ball is 10 meters from the illustrative target 156, cameras 154*a*, 154*b* and 154*c* may increase the number of images captured by the camera 154*a*, 154*b* and 154*c* so that the precise target struck by the RFID golf ball may be determined.

At block 224, a second ToF receiver tracks the battery assisted RFID golf ball as it travels towards the target. By way of example and not of limitation, the illustrative ToF receiver 159 receives RF signals from the battery assisted RFID golf ball 145. As previously stated, the battery assisted RFID golf ball 145 transmits RF signals that are captured by the ToF receiver 159.

At block 226, the RFID reader corresponding to the target reads the illustrative battery assisted RFID golf ball. By way of example and not of limitation, the illustrative target 180 includes an RFID reader 190 that reports the RFID or other unique identifier to the control unit 184 and via the network (not shown) to the server (not shown).

The method then proceeds to block 228, where the camera from the hitting bay may be used to provide further authentication. More specifically, the camera 152 that is positioned above the illustrative hitting bay may follow the ball path to the destination target 156. The camera 152 is communicatively coupled to the server or bay control unit 144 is capable of recording the time of the ball leaving the hitting bay, the speed of the ball, the ball trajectory and the ball striking the target 156. Thus, the output from camera 152 may also be used to authenticate that target 156 was struck by a golf ball. The game session ends when the illustrative battery assisted RFID golf ball has struck the target.

Figure 13:
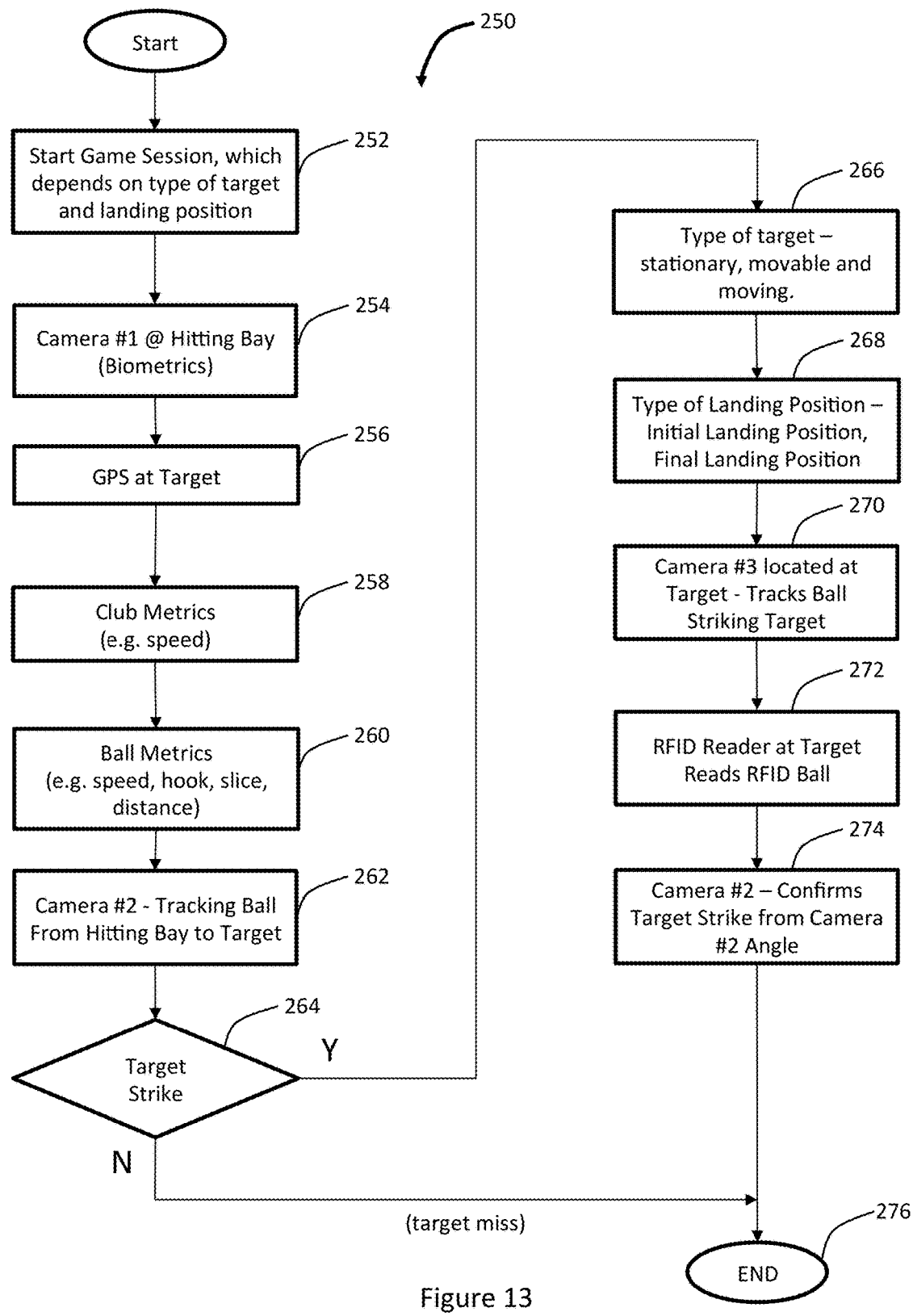
FIG. 13 shows an illustrative flowchart for an illustrative game session that is monitored by a plurality of cameras.

Referring to FIG. 13 there is shown a flowchart for an illustrative game session that is monitored by the cameras described above. Note, that unlike FIG. 12, in this illustrative embodiment only the cameras are used to authenticate that the RFID golf ball has struck the target. The illustrative flowchart 250 begins at block 252, where a game session is initiated as described above.

At block 254, an illustrative first camera disposed in the hitting bay determines that a player is in the hitting bay. As described above, the illustrative first camera may act a sensor that captures a player biometric, e.g. a face, and communicates the captured biometric to a database for biometric matching.

At block 256, a GPS reading for a particular target is captured as described above. At illustrative block 258, the club metrics are monitored or determined by the illustrative hitting booth cameras described above. The method may then proceed to block 260 where ball metrics may be calculated and/or recorded as described above.

At block 262, another illustrative camera tracks the illustrative battery assisted RFID golf ball. As described above, the camera 152 (shown in FIG. 8) is positioned above the illustrative hitting bay and may have a separate and distinct opportunity to capture the ball path 158.

At block 264, a determination is made that the illustrative target has been struck. If the target is missed, then the game session has been terminated and the game session ends at 276. However, if the illustrative target 156 (see FIG. 8) has been hit, then the method proceeds to block 266. As stated above, the game session depends on the type of target, as represented by block 266, and type of landing position, as represented by block 268.

At block 270, a third camera located at or near the target tracks the illustrative golf ball as the illustrative RFID golf ball strikes the target. The third camera provides more precision and accuracy for authenticating that appropriate portion of target 156 has been hit.

At block 272, the RFID reader corresponding to the target reads the illustrative battery assisted RFID golf ball as described above. The method then proceeds to block 228, where the camera from the hitting bay may be used to provide further authentication. More specifically, the camera 152 that is positioned above the illustrative hitting bay may follow the ball path to the destination target 156. The game session ends when the illustrative battery assisted RFID golf ball has struck the target.

Figure 14:
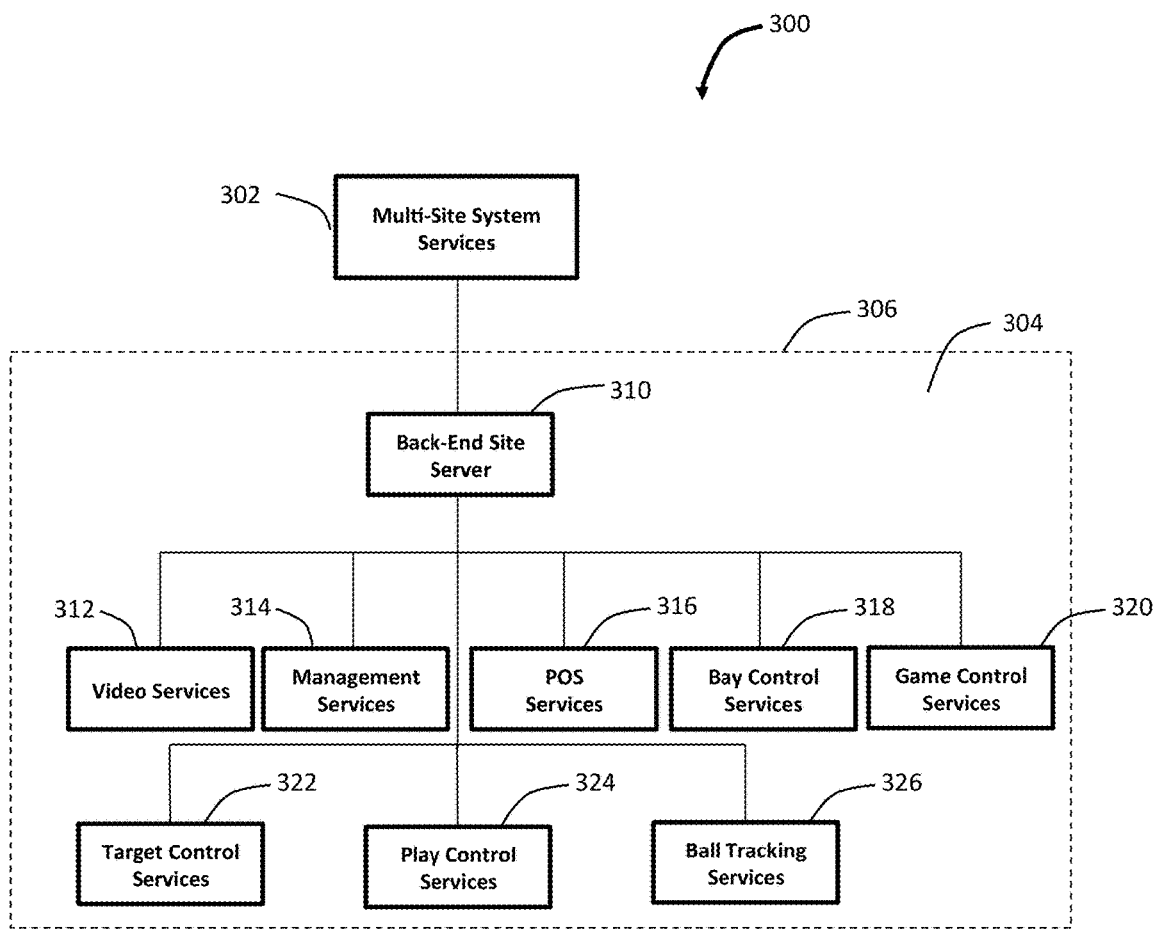
FIG. 14 shows an illustrative software architecture that performs the operations associated with a target.

Referring now to FIG. 14, there is shown an illustrative software architecture 300 configured to perform the operations associated with a taRGET. The illustrative software architecture 300 includes a multi-site system services module 302 and a local site services module 304. The multi-site system service module 302 is presented outside the site service boundary 306 that provides an illustrative boundary condition of the site services module 304.

The illustrative multi-site system services module 302 supports the services for multiple operational sites or facilities, in which each operational site may include a site services module 304. Thus, the multi-site system services module 302 performs specific services for multiple operational sites. By way of example and not of limitation, these multi-site services may include a software management module associated with at least one wide-area progressive prize, a first database for player prize points, a second database that includes a plurality of merchandise prizes that may be purchased with player prize points, a prize software module that includes one or more access functions that enable each player to access information corresponding to prize points and redeeming prizes. Additionally, the multi-site system services module 302 may also include a database of information regarding the operational and financial performance of individual sites.

In an illustrative embodiment, the multi-site system service module 302 and the site services module 304 may be accessible on a WAN, e.g. the Internet, through common desktop or mobile browsers such as Internet Explorer, Chrome, or other such browsers. The multi-site system service module 302 and the site services module 304 may also be accessible through an "application" that is loaded on a personal computing device such as a tablet computer, a smartphone, virtual reality goggles and other such personal computing devices. Additionally, certain aspects of the multi-site system services 302 may only be accessed by authorized components of one or more of the site services modules 304.

The site services module 304 includes a back-end site server 310 that may be located in the operational facility or on a remotely located operational site, in a co-hosting location, in a cloud-based facility or in any other such computing facility. The location of the back-end site server 310 may be based on the system design constraints such as cost, reliability, security, throughput and response time. The back-end site server 310 may also be embodied as a suite of multiple servers.

The back-end site server 310 stores and processes the operational site data. For example, the storage capabilities of the back-end site server 310 include database structures utilized for financial and operational needs. In one illustrative embodiment, the back-end site server 310 includes detailed site financial data and performs management of all player financial play sessions. In another illustrative embodiment, the back-end site server 310 stores and processes historical information on player activity and aggregates statistical information on all game play and games. Additionally, the back-end site server 310 logs system activity, game activity and configuration data on the system, including target location data. Furthermore, the back-end site server 310 may host multiple software applications for management of the site operation, including human resources and employee scheduling. Further still, the back-end site server 310 may be embodied as one or more virtual servers that may be associated with a cloud service such as Amazon Web Services or Microsoft Azure.

The back-end site server 310 may include or be communicatively coupled to a video services module 312. The video services module 312 manages video-specific information such as the site-wide video resources that include certain monitors in the hitting bays, large monitors in multiple locations in the facility, monitors in restaurants, monitors in the target range, monitors in reception areas and in any other locations where it may be desirable to display information to players. The video services information managed by the video services module 312 may include promotional information for the site, advertising, winner recognition, player bonus play, informational videos, and other such video information. Additionally, video services may include information regarding active game play, leader boards, reward structures and payouts.

Also, the back-end site server 310 may include or be communicatively coupled to a management services module 314 that will provide access to the information and operational functions necessary for site operation. The management services module 314 allows employees to access operational sub-systems according to applicable security protocols and sub-system operational parameters. The management service module 314 may also provide access to financial and operational history information, as well as the ability to configure the operational aspects of the system.

A POS services module 316 may also be communicatively coupled to the back-end site services module 310. The POS services module 316 is operatively coupled to kiosks or cash registers disposed at retail points and POS stations. By way of example and not of limitation, the kiosks or cash registers may be used to create player accounts, add funds to player accounts, provide refunds, and perform other player service functions.

The back-end site server 310 may include or be communicatively coupled to a hitting bay control services module 318. The bay control service module 318 may be processed or managed by hitting bay server (not shown), or any combination thereof. The bay control services module 318 manages player activity in each hitting bay. Additionally, the bay control services module 318 coordinates the operations associated with player accounting, selection of games, display of play and game information in the hitting bay, initiating and monitoring of ball dispensing, reporting play results, accepting additional player funds and other such bay control operations. The bay services module 318 may also coordinate the activities associated with the ball dispenser 100, the game control services module 320, input from player identification devices, such as card readers and smartphones, and play control services module 324. Additionally, the bay services module 318 may also recognize the initiation of game play.

The back-end site server 310 may include or be communicatively coupled to the game control services module 320, which is configured to support a suite of game modules corresponding to a variety of games that players will be able to select in the hitting bays. The games may include many types of entertainment and wagering games. Each type of game will have different video presentations and may, in the case of wagering games, be associated with different pay-tables and use the services of a secure RNG to produce game results which may be the hybrid result of the results of a skill-based event and the random results based on one or more RNG results. Additionally, the game control services module 320 may also display ongoing game progress and competitive position for live/active play. Furthermore, the game control services module 320 compiles historical play in information to update odds and percentages for an on-going game.

The back-end site server 310 may include or be communicatively coupled to a target control services module 322. The target control services module 322 manages activity corresponding to one or more targets and, further, makes determinations associated with target hits. The target control services module 322 may also perform functions that include controlling or communicating with the ball tracking subsystem, which may include a plurality of optical, radio, and infrared detectors and/or cameras that, among other things, determine when a ball has entered the target 102. Furthermore, the target control services module 322 may be configured to divert a ball with an unreadable RFID to a holding area for removal from the movable and moving multiple golf target system. Further still, the target control services module 322 may be configured to isolate a ball that has been determined to have won a high-value prize for prize validation and security purposes. Still further, the target control services module 322 may also determine, recalibrate, and confirm the location of targets in relation to the player and driving space. Further yet, the target control services module 322 provides critical information such as distance, slope, and other such information significant to the movable and moving targets.

The back-end site server 310 may include or be communicatively coupled to the play control services module 324. The play control services module 324 provides the detailed management for the devices associated with receiving and hitting a ball, which includes the detection of the player requesting a ball, such as by the player identification device, the validation that the ball to be dispensed has a valid unique identification indicator, such as an RFID, the diversion of a ball with an unreadable unique identification indicator, such as an RFID, to a holding area for removal from the system, and the dispensing of the ball to the player by the dispenser 100. Additionally, the play control services module 324 associates and tracks a player and the player's activity with a game object.

The back-end site server 310 may include or be communicatively coupled to a ball tracking services module or ball tracking subsystem 326. The ball tracking services module 326 stores, manages or controls ball information that includes ball location from the time of the ball hit until the flight of the ball concludes. The ball information may also include generation of directional information on the flight of the ball, which may be used to calculate probable target impacts. Depending on details of system implementation, information sources for the calculations can come from one or more of the following sources: dual-matrix tracking apparatus, Doppler radar, video images, laser tracking devices, RFID readings, other new or equivalent technology, and any combination thereof. Additionally, the ball tracking services module 326 also tracks key information regarding timing for flight of the ball for verification and legitimacy of game play.

It will be appreciated by those of skill in the art that there are multiple ways of implementing the software systems and methods described above. For example, the systems and corresponding software architecture may be embodied in a dedicated local computer or microprocessor or may be embodied in a local server, a virtualized server, a remotely hosted server, a cloud-based service provider, such as AWS and Azure, and any other such source. The software modules may also be embodied in a client-server system, a peer-to-peer system, a hierarchical computing system or any combination thereof. Communications between the various electronic and computing systems may be performed using LAN communications, WAN communications and other viable communication methodologies, including serial or parallel data transfer, Bluetooth, NFC and other such technologies.

It is to be understood that the detailed description of illustrative embodiments are provided for illustrative purposes. The order of particular methods, processes, steps or blocks may vary and in some instances specific steps or blocks may not be necessary. Additionally, hardware components and software components may be combined or may be distributed depending on the system architecture, product requirements and customer expectations. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. A golf ball tracking system comprising:
   a golf ball that includes,
       a memory that stores a unique identifier associated with the golf ball;
       a logic component electrically coupled to the memory;
       an antenna electrically coupled to the logic component;
       a battery electrically coupled to the logic component, the antenna and the memory, wherein the battery powers transmission of the unique identifier using the antenna at one or more frequencies; and
   a stationary time of flight (ToF) receiver configured to receive the unique identifier transmitted by the golf ball, the unique identifier communicated to the ToF receiver at a frequency that tracks the location of the golf ball along a ball path.

2. The golf ball tracking system of claim 1 further comprising an RFID component that includes the memory.

3. The golf ball tracking system of claim 1 further comprising an induction coil that is electrically coupled to the battery, wherein the induction coil is configured to convert electromagnetic energy to electrical current that charges the battery.

4. The golf ball tracking system of claim 3 further comprising a charging mode that charges the battery, when the unique identifier is not communicated by the golf ball.

5. The golf ball tracking system of claim 1 further comprising an accelerometer sensor communicatively coupled to the logic component, wherein the accelerometer determines that the golf ball is struck.

6. The golf ball tracking system of claim 5 further comprising a low frequency reading mode that transmits the unique identifier at a low frequency before a change in acceleration detected by the accelerometer.

7. The golf ball tracking system of claim 6 further comprising a high frequency mode that transmits the unique identifier at a high frequency when a ball strike is detected based on the change in acceleration detected by the accelerometer.

8. A method for operating a golf ball tracking system comprising:
   enabling a golf ball to transmit a unique identifier, wherein the golf ball includes,
       a memory that stores a unique identifier associated with the golf ball,
       a logic component electrically coupled to the memory,
       an antenna electrically coupled to the logic component,
       a battery electrically coupled to logic component, antenna and memory, wherein the battery powers the transmission of the unique identifier using the antenna at one or more frequencies; and
   receiving the unique identifier generated by golf ball at a stationary time of flight (ToF) receiver, the unique identifier communicated to the ToF receiver at a frequency that tracks the location of the golf ball along a ball path.

9. The method for operating the golf ball tracking system further comprising an RFID component that includes the memory.

10. The method for operating the golf ball tracking system of claim 9 further comprising an induction coil that is electrically coupled to the battery, wherein the induction coil is configured to convert electromagnetic energy to electrical current that charges the battery.

11. The method for operating the golf ball tracking system of claim 8 further comprising an accelerometer sensor communicatively coupled to the logic component, wherein the accelerometer determines that the golf ball is struck.

12. The method for operating the golf ball tracking system of claim 11 further comprising a low frequency reading mode that transmits the unique identifier at a low frequency before a change in acceleration detected by the accelerometer.

13. The method for operating the golf ball tracking system of claim 12 further comprising a high frequency reading mode that transmits the unique identifier at a high frequency when a ball strike is detected based on the change in acceleration detected by the accelerometer.

* * * * *